United States Patent
Szuba et al.

(10) Patent No.: US 8,182,351 B2
(45) Date of Patent: May 22, 2012

(54) UNIVERSAL JOINT ASSEMBLY FOR AN AUTOMOTIVE DRIVELINE SYSTEM

(75) Inventors: Joseph Szuba, Dearborn, MI (US);
Henry Fradkin, Dearborn, MI (US);
Robert D. Kucinski, Clay, MI (US)

(73) Assignee: Ronjo LLC, Rochester, MI (US)

( * ) Notice: Subject to any disclaimer, the term of this patent is extended or adjusted under 35 U.S.C. 154(b) by 0 days.

(21) Appl. No.: 13/212,298

(22) Filed: Aug. 18, 2011

(65) Prior Publication Data
US 2011/0300954 A1   Dec. 8, 2011

Related U.S. Application Data

(63) Continuation-in-part of application No. 11/939,031, filed on Nov. 13, 2007.

(51) Int. Cl.
*F16D 3/40* (2006.01)

(52) U.S. Cl. .................................................. 464/134

(58) Field of Classification Search ............. 464/134, 464/135
See application file for complete search history.

(56) References Cited

U.S. PATENT DOCUMENTS

| | | | |
|---|---|---|---|
| 2,067,283 A | 1/1937 | Padgett | |
| 3,107,506 A | 10/1963 | Klomp | |
| 4,180,989 A * | 1/1980 | Lange | 464/135 |
| 4,307,833 A | 12/1981 | Barnard | |
| 4,505,317 A | 3/1985 | Prince | |
| 4,522,608 A | 6/1985 | Joyner | |
| 4,702,722 A | 10/1987 | Narue et al. | |
| 4,881,924 A * | 11/1989 | Gall | 464/134 |
| 4,995,849 A | 2/1991 | Castellon | |
| 5,326,322 A | 7/1994 | Fechter | |
| 5,342,243 A | 8/1994 | Seksaria et al. | |
| 5,601,377 A | 2/1997 | Ohya | |
| 5,622,085 A | 4/1997 | Kostrzewa | |
| 5,628,578 A | 5/1997 | McClanahan et al. | |
| 5,845,394 A | 12/1998 | Abe et al. | |
| 5,946,977 A | 9/1999 | Sato et al. | |
| 6,162,126 A | 12/2000 | Barrett et al. | |
| 6,280,335 B1 | 8/2001 | Wehner et al. | |
| 6,336,868 B1 | 1/2002 | Kurecka et al. | |
| 6,408,708 B1 | 6/2002 | Sahr | |
| 6,428,418 B1 | 8/2002 | Appelt et al. | |
| 6,591,706 B2 | 7/2003 | Harer et al. | |
| 6,623,363 B2 | 9/2003 | Guptill et al. | |
| 6,643,911 B2 | 11/2003 | Nakamura et al. | |
| 6,736,021 B2 | 5/2004 | Adams et al. | |
| 6,817,511 B2 | 11/2004 | Durand | |
| 2005/0028341 A1 * | 2/2005 | Durand et al. | |
| 2008/0315546 A1 * | 12/2008 | Kucinski et al. | |

OTHER PUBLICATIONS

PCT/US05/39054 International Search Report dated Sep. 25, 2006.

* cited by examiner

*Primary Examiner* — Gregory Binda
(74) *Attorney, Agent, or Firm* — Howard & Howard Attorneys PLLC

(57) ABSTRACT

A die formed monolithic yoke assembly for a universal joint of an automotive driveline assembly subject to high torsional loads having a substantially uniformed thickness, including a cup-shaped portion, a pair of opposed lugs integral with and extending from an upper portion of the cup-shaped portion and an integral, outwardly deformed substantially continuous lip portion extending outwardly from the upper surface of the annular wall and the lugs substantially strengthening the yoke assembly particularly against torsional loads. In one embodiment, the upper end of the cup-shaped portion included concave arcuate portions on opposed sides of the lugs adjacent the lugs, such that the upper surface of the cup-shaped portion transitions from a concave surface to a convex surface strengthening the yoke.

15 Claims, 11 Drawing Sheets

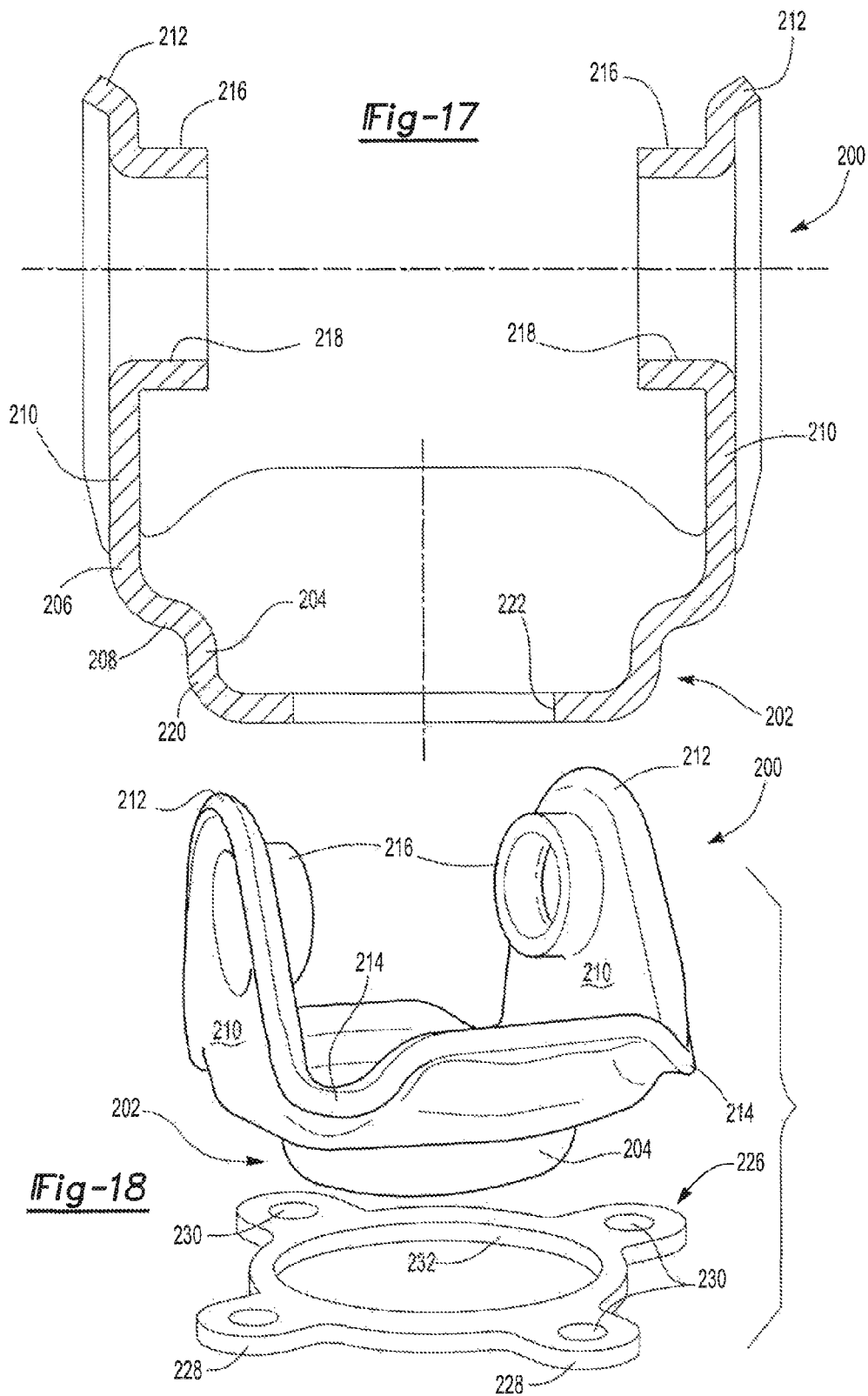

UNIVERSAL JOINT ASSEMBLY FOR AN AUTOMOTIVE DRIVELINE SYSTEM

RELATED APPLICATIONS

This application is a continuation in part application of U.S. patent application Ser. No. 11/939,031 for a UNIVERSAL JOINT ASSEMBLY FOR AN AUTOMOTIVE DRIVELINE SYSTEM, filed on Nov. 13, 2007, which claims priority to U.S. application Ser. No. 11/262,622 for a UNIVERSAL JOINT ASSEMBLY FOR AN AUTOMOTIVE DRIVELINE SYSTEM, filed on Oct. 31, 2005, now U.S. Pat. No. 7,320,645, which claims priority to U.S. Provisional Patent Application Nos. 60/636,190 for a UNIVERSAL JOINT ASSEMBLY FOR AN AUTOMOTIVE DRIVELINE SYSTEM, filed on Dec. 15, 2004, and which application claimed the benefit of the provisional patent application Ser. No. 60/623,674 for a VEHICLE HAVING A UNIVERSAL JOINT DEVICE AND A PROCESS OF MAKING THE SAME, filed on Oct. 29, 2004 and, which are hereby incorporated by reference in their entireties.

BACKGROUND OF THE INVENTION

1. Field of the Invention

The subject invention relates generally to a driveline system for a vehicle transmission. More particularly, the present invention relates to a universal joint component of the driveline system subject to high torsional loads and a method of forming the same by stamping.

2. Description of the Prior Art

A drive axle assembly of an automotive vehicle transmits torque from an engine and a transmission to drive vehicle wheels. The drive axle assembly changes the direction of the power flow, multiplies torque, and allows different speeds between the two of the drive wheels. The drive axle assembly includes a plurality of components engaged in operative communication one with the other. One of these components is a universal joint, subject to high torsional loads, typically greater than 2,000 ft. lbs. applied at the joint. Typically, the universal joint includes a pair of bifurcated yokes or yoke portions, which are secured to drive shafts and which are interconnected by a cruciform for rotation about independent axes. The cruciform includes four orthogonal trunnions with each opposing pair of axially aligned trunnions mounted in a pair of aligned bores formed in the bifurcated yokes.

Typically, a bearing cup is secured in each bore and a bearing assembly is retained in the bearing cup such that each yoke is supported for pivotal movement relative to a pair of the trunnions. Various conventional universal joints having yoke portions are known to those skilled in the vehicle driveline art and are widely used in the automotive industry today. These universal joints are disclosed in U.S. Pat. Nos. 4,307,833 to Barnard; 5,601,377 to Ohya; 5,622,085 to Kostrzewa; 5,845,394 to Abe et al.; 6,162,126 to Barrett et al.; 6,280,335 to Wehner et al.; 6,336,868 to Kurecka et al.; 6,408,708 to Sahr; 6,591,706 to Harer et al.; and 6,736,021 to Adams et al.

The U.S. Pat. No. 5,601,377 to Ohya, for example, teaches an automobile steering column that transmits the rotation of the steering wheel to the steering gearbox. For increasing the degree of freedom of geometric arrangement of the steering system, the steering column has a plurality of steering shafts which are connected with each other by universal joints. The universal joint, taught by the U.S. Pat. No. 5,601,377 to Ohya, has a pair of conventional yokes and a cross member. Each yoke has a base portion and a pair of arm portions or lugs opposed to each other in a diametrical direction of the yoke and extend in an axial direction of the yoke. Each arm portion has a circular opening and sides extending in a parallel relationship with the axial direction of the yoke. The yoke of the U.S. Pat. No. 5,601,377 to Ohya is taught to be connected to a steering shaft and is not subjected to numerous rotational movements as, for example, a yoke portion connected to a universal joint of a driveline and is, therefore, not considered as being feasible for use on the driveline. In addition, the yoke does not include reinforcing features of any kind to prevent bending of the arm portions during rotation of the yoke.

The U.S. Pat. No. 5,845,394 to Abe et al., for example, teaches a method of manufacturing a yoke portion having two spaced lugs for a universal joint from a blank of a sheet metal to receive the yoke portion of a uniform thickness. Similar to the yoke taught by the aforementioned U.S. Pat. No. 5,601,377 to Ohya, the spaced lugs are not reinforced to provide structural integrity of the yoke portion. Again, the yoke portion is taught to be connected to a steering shaft and is not subjected to numerous rotational movements as, for example, a yoke portion connected to a universal joint of a driveline and is, therefore, not considered as being feasible for use on the driveline.

To reduce the effect of vibration and the resulting noises, manufacturers have used various methods to construct drive shafts and universal joints connected thereto. Typical prior art yoke portions are iron cast to provide durability but are difficult to balance.

The prior art has also proposed making yokes for a universal joint of an automotive driveline system by bolting a U-shaped yoke member to a plurality of plates, one of which includes a shaft, such as disclosed, for example, in U.S. Pat. No. 4,702,722 of Narue et al. As will be understood by those skilled in this art, however, any misalignment of these several components of this yoke assembly will result in vibration or the components may become misaligned following assembly. Further, this yoke assembly is relatively expensive, particularly when compared with the improved universal joint of this invention.

The prior art also includes forks for yoke assemblies for cardan or constant velocity joints. U.S. Pat. No. 4,995,849 discloses a cardan joints for a steering column which is produced by stamping from a metal sheet. However, the disclosed fork would not be suitable for the universal joint of an automotive driveline assembly subject to high torsional loads.

The opportunity exists for an improved universal joint and method of manufacturing the same that will reduce the mass of the yoke portion thereby reducing the effect of vibrations and the resulting noises, add structural integrity to the universal joint, make it easier to balance, and increase performance of drive line applications at a low cost and a high volume.

BRIEF SUMMARY OF INVENTION

A differential assembly for an automotive driveline system includes a transmission device, a differential device, and at least one drive shaft that extends between the transmission and differential devices. The drive shaft presents an operative communication with the transmission device and the differential device. A universal joint device rotates around a longitudinal axis and presents operative communication with the transmission device and the differential device. The universal joint device of this invention includes at least one yoke portion having a dish or bowl-shaped portion, including a tubular or annular sidewall and an integral base wall which may have an enlarged central opening therethrough rotatable about a longitudinal axis. A pair of opposed spaced arcuate ear portions or lugs are integrally formed with the tubular sidewall and extend longitudinally from the sidewall. The yoke of this invention further includes a pair of opposed coaxially aligned annular sleeves integrally struck from each of the ears and extending from the ears. The monolithic yoke of this invention may be formed by stamping a metal plate having a substantially uniform thickness. In one embodiment, the ear or lug portions of the monolithic yoke of this invention include a generally cup-shaped portion including a tubular or annular portion having a diameter greater than the bowl-shaped portion and a radial portion integral with the bowl-shaped portion. In this embodiment of the invention, the enlarged central opening through the base wall of the bowl-shaped portion has a diameter equal to at least sixty percent of the overall diameter of the bowl-shaped portion, thereby substantially reducing the weight of the yoke. Further, this embodiment, the bowl-shaped portion has a continuous upper end and the upper end includes a folded lip portion extending radially outwardly from the bowl-shaped portion.

A connector extends between the yoke portion to mechanically engage at least one of the transmission devices and the differential device to yoke portion thereby defining the aforementioned operative communication. The inventive yoke portion reduces vibration of the universal joint connected to the yoke portion of the generally equal thickness as the universal joint rotates about the longitudinal axis.

As would be understood by those skilled in this art, the yoke assembly for a universal joint of an automotive driveline assembly of this invention is subject to high torsional loads, typically torsional loads greater than 2000 foot pounds. In a typical application, the torsional load may exceed 2,250 foot pounds. In one preferred embodiment, the yoke assembly is formed by stamping a sheet of High Strength Low Alloy (HSLA) Steel. As will be understood those skilled in the art, stamping HSLA sheet work hardens the material, increasing the strength about 30%. The stamping operation also results in some thinning of the material in localized areas, less than 20% or less than about 10%.

In the new embodiment of the die formed monolithic yoke assembly for a universal joint of an automotive driveline assembly of this invention disclosed in this application, the monolithic yoke assembly includes a cup-shaped portion having an annular wall, including a base portion and an upper surface, a pair of spaced opposed lugs or ears integral with and extending from the upper surface of the annular portion of the cup-shaped portion having an upper surface, and an integral, outwardly deformed substantially continuous lip portion extending generally outwardly from the upper surfaces of the annular wall of the cup-shaped portion and the lugs, further strengthening the yoke against torsional loads. In the disclosed embodiment, the upper surface of the annular wall of the cup-shaped portion includes a concave arcuate portion adjacent the lugs transitioning from a concave surface to a convex surface at the outwardly deformed lip portion, further strengthening the yoke assembly against torsional loads, in this embodiment, the lugs of the monolithic yoke assembly each include opposed coaxially aligned tubular sleeves.

The monolithic yoke assembly of this invention preferably has a thickness of less than 10 mm., but the thickness may vary from 3, 4, or 5 mm depending upon the size of the vehicle and the torque requirements. In the disclosed embodiment, the lip extends completely around the upper surface of the lugs and extends to and including the upper surface of the annular wall between the lugs. The lip extends outwardly generally transverse to the outer surface of the lugs and the annular wall. In one preferred embodiment, the lip extends at an angle of about 45 degrees relative to the outer surfaces of the lugs and the annular wall. The lip has a length sufficient to reinforce the yoke against torsional loads. In the disclosed embodiment, the lip has a length at least about equal to the thickness of the yoke.

An advantage of the present invention is to provide an improved yoke portion for a universal joint that may be stamped from a sheet metal presenting a light weight alternative to an iron cast yoke portion for an automotive driveline assembly axis known in the prior art, which reduces the effect of vibrations and the resulting noises.

Another advantage of the present invention is to provide an improved yoke portion that reduces the mass of the improved yoke portion thereby making it easier to balance and increase performance of the driveline applications at a low cost and a high volume.

Still another advantage of the present invention is to provide an improved yoke portion wherein each spaced lug presents a central axis which may have sloping side walls inclined from the head to the neck thereby reducing stress applied to the yoke portion and preventing the spaced lugs from bending as the yoke portion rotates around the longitudinal axis.

BRIEF DESCRIPTION OF THE DRAWINGS

Other advantages of the present invention will be readily appreciated as the same becomes better understood by reference to the following detailed description when considered in connection with the accompanying drawings wherein:

FIG. 17 is a side cross sectional view of the monolithic yoke assembly shown in FIGS. 13 to 16 in the direction of view arrows 20-20 in FIG. 16;

FIG. 18 is a perspective view of the monolithic yoke assembly shown in FIGS. 13 to 17.

DETAILED DESCRIPTION OF THE INVENTION

Figure 1:
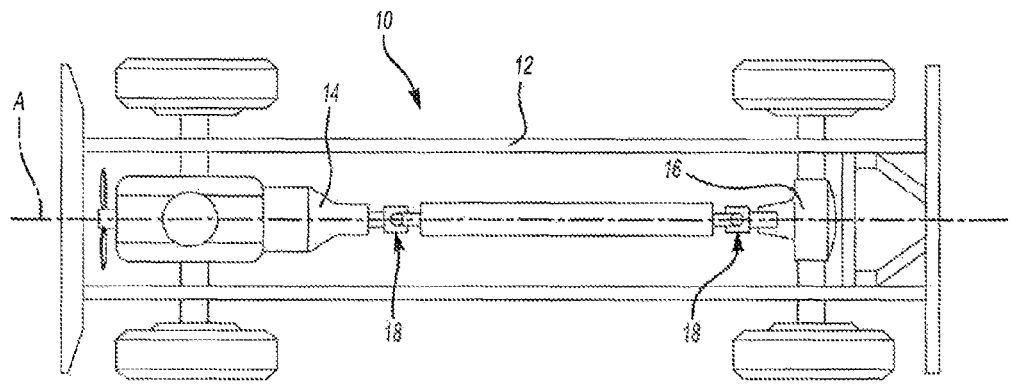
FIG. 1 shows an elevational view of a vehicle frame having a driveline system.

Referring to FIG. 1, a chassis of an automotive vehicle, generally shown at 10, includes a frame 12 and a driveline mechanism. The driveline mechanism includes a transmission assembly 14, a differential assembly 16, and two universal joints, generally indicated at 18, extending between the transmission assembly 14 and the differential assembly 16 presenting an operative communication therebetween. The universal joint 18 rotates around a longitudinal axis A during its operational mode. The universal joint 18, as better illustrated in FIG. 2, includes a first drive shaft 19 and a second drive shaft 20 with a pair of yokes, such as, for example a first yoke 24 and a second yoke 26. The first yoke 24 is attached to the first drive shaft 19 and the second yoke or yoke portion 26 is attached to the second drive shaft 20.

A connector or cruciform assembly, generally shown at 28, interconnects the first yoke 24 and the second yoke 26. The cruciform assembly 28 includes a cross member, generally indicated at 30, has a central hub 32 and a pair of first trunnions 34 and 36 and a pair of second trunnions 38 and 40. The first trunnions 34 and 36 are orthogonal with respect to the second trunnions 38 and 40, with all of the trunnions 34, 36, 38, and 40 aligned within a common plane. The first trunnions 34 and 36 are cylindrical and are adapted for insertion into the first yoke 24. Similarly, the second trunnions 38 and 40 are cylindrical and are adapted to be inserted into the second yoke 26. The cruciform assembly 28 and the first yoke 24 are known to those skilled in a differential art and are not described and/or illustrated in great details.

Referring to FIGS. 3 through 7 the second yoke 26 is illustrated in greater detail showing one embodiment of the present invention. The second yoke 26 is connected to each of the terminal ends of the second drive shaft 20 and presents an internal surface, generally indicated at 42, and an external surface, generally indicated at 44. The second yoke 26 presents a generally equal thickness defined between the internal surface 42 and the external surface 44. A cup portion or a dish 46 of the second yoke 26 includes a frustoconical configuration. The cup portion 46 has a bottom or base 50 defined by an upper annular wall 52.

A pair of spaced lugs 58 and 60 extends outwardly to a head 62, 64, respectively, from the annular wall 52. Sloping side walls 66 and 68 interconnect each of the heads 62 and 64 with the annular wall 52 to define a neck, generally indicated at 70, of each of the spaced lug 58 and 60. Each sloping side wall 66 and 68 presents an acute angle defined between the axis A and each sloping side wall 66 and 68. Each of the spaced lugs 58 and 60 includes an opening 72. Preferably, the diameter of the opening 72 equals the distance defined between the opening 72 and the bottom or base 50 the cup portion 46. The spaced lugs 58 and 60 are oriented diametrically with respect to one and the other. Each of the spaced lugs 58 and 60 includes an annular sleeve 74 integral with and circumscribing the opening 72. The annular sleeve 74 extends outwardly from the internal surface 42 of the second yoke 26. The annular sleeve 74 presents a mechanical engagement with a pair of the first 34, 36 or second 38, 40 trunnions of the cruciform assembly 28 in a manner known to those skilled in the differential art. In addition, the annular sleeve 74 provides additional structural reinforcement for locking the pair of the first 34, 36 or second 38, 40 trunnions of the cruciform assembly 28 within and between the spaced lugs 58 and 60.

A plurality of notches 78 and 80 are defined in the annular wall 52. A pair of oppositely spaced tabs 82 and 84 is defined between each of the notches 78 and 80. Each of the spaced tabs 82 and 84 terminates in a folded lip portion 86 to strengthen the second yoke 26 in this area of cut off. A pair of dimples 90 and 92 is formed in each of the spaced lugs 58 and 60. Each dimple 90 and 92 is concavely curved to define a cavity as viewed from the external surface 44 of the yoke portion and a beveled configuration as viewed from the internal surface 42. Each dimple 90 and 92 extends from each spaced lug 58 or 60 to the bottom or base 50 the cup portion 46 with each of said dimples 90 and 92 formed below the annular sleeve 74. The dimples 90 and 92 are designed to strengthen the spaced lugs 58 and 60.

Figure 6:
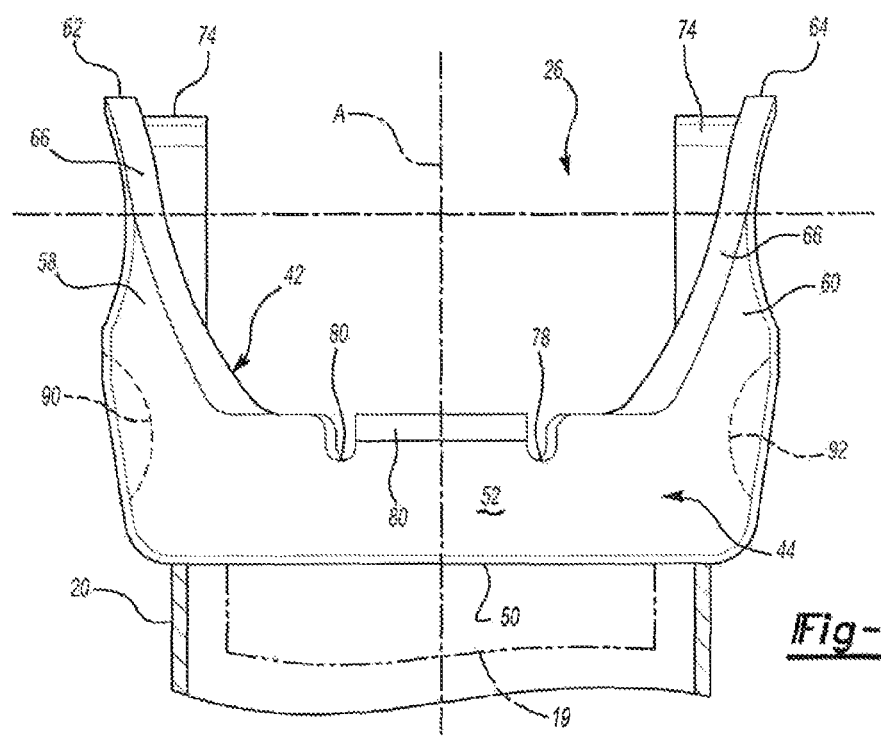
FIG. 6 is a side and partially cross sectional view of the yoke portion shown in FIG. 3 connected laser or spin welding to a drive shaft of various diameters.
Figure 7:
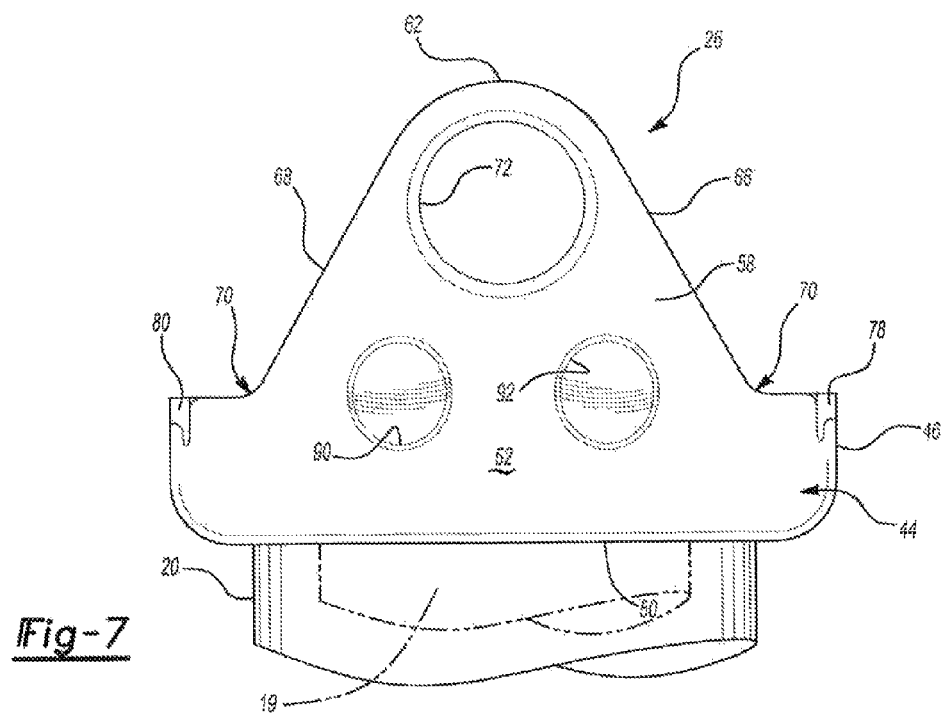
FIG. 7 an end view of the yoke portion shown in FIG. 6.

Referring to FIG. 6, the yoke portion 26 is connected to the first drive shaft 19 or the second drive shaft 20 of various diameters, which may vary from 3" to 3.5", respectively, by welding. Preferably, laser welding is used to connect. Laser welding uses amplified light as the source to produce the weld, i.e. specific wave length of light to accomplish the welding process. As a high production welding process, laser welding produces deep penetration welds with minimum heat effective zones and has the advantage of welding dissimilar metals while producing very low heat. Laser welding is faster, cleaner, and more cost effective for manufacturing the inventive concept.

Alternatively, the yoke portion 26 and the drive shaft 19 or 20 may be connected by spin or friction welding. Spin or friction welding uses heat generated by rotational friction at the joint line defined between the yoke portion 26 the drive shaft 19 or 20 to weld them together. A machine (not shown) applies pressure axially while rotating one of the part, such as, for example, the yoke portion 26 against its stationary positioned mate, such as, for example, the drive shaft 19 or 20, and the resulting friction generates heat that melts the parts together. Advantages of the spin welding process, used in the present invention, include high quality permanent joints, hermetic seals, lower equipment costs, ease of assembly, energy efficient operation, no ventilation required, immediate handling, entrapment of other parts, far-field welding capability and no additional material requirements. However, the constant thickness of the inventive yoke 26 allows for the use of MIG welding or an equivalent not available to prior art cast yokes.

The second yoke 26 includes a first alternative embodiment, generally shown at 100 in FIGS. 8 through 11. The second yoke 100 presents a generally equal thickness defined between the internal surface, generally indicated at 102, and the external surface, generally indicated at 104. A cup portion or dish 106 of the second yoke 100 includes a frustoconical configuration. The cup portion 106 has a bottom or base defined by an annular wall 110 and forming the cup portion 106. A neck 112 extends outwardly from the annular wall 110. The neck 112 has a diameter sized to receive the drive shaft 20.

Figure 10:
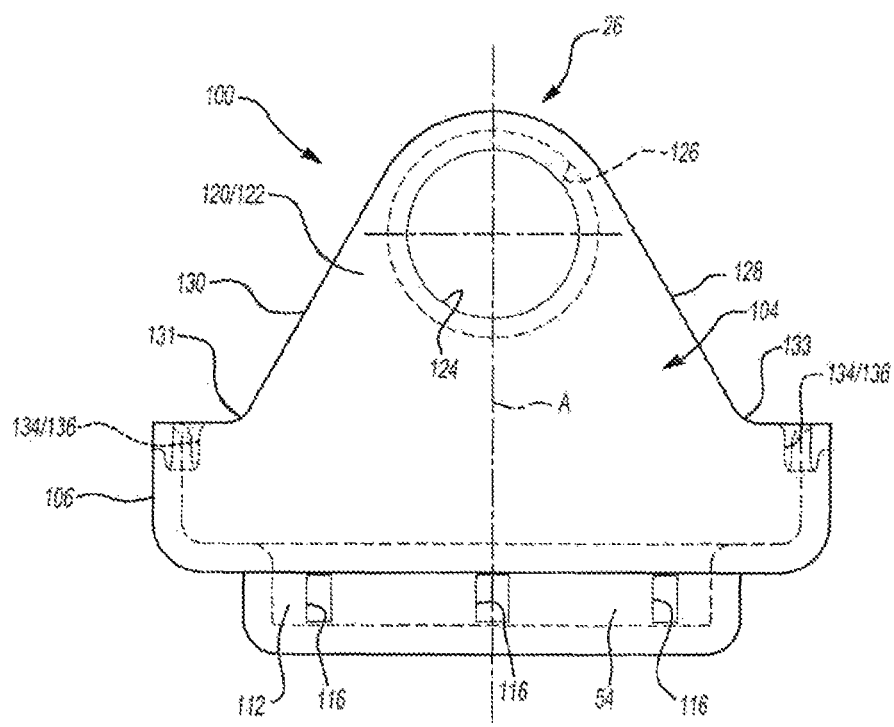
FIG. 10 is an end view of the yoke portion shown in FIG. 8.
Figure 11:
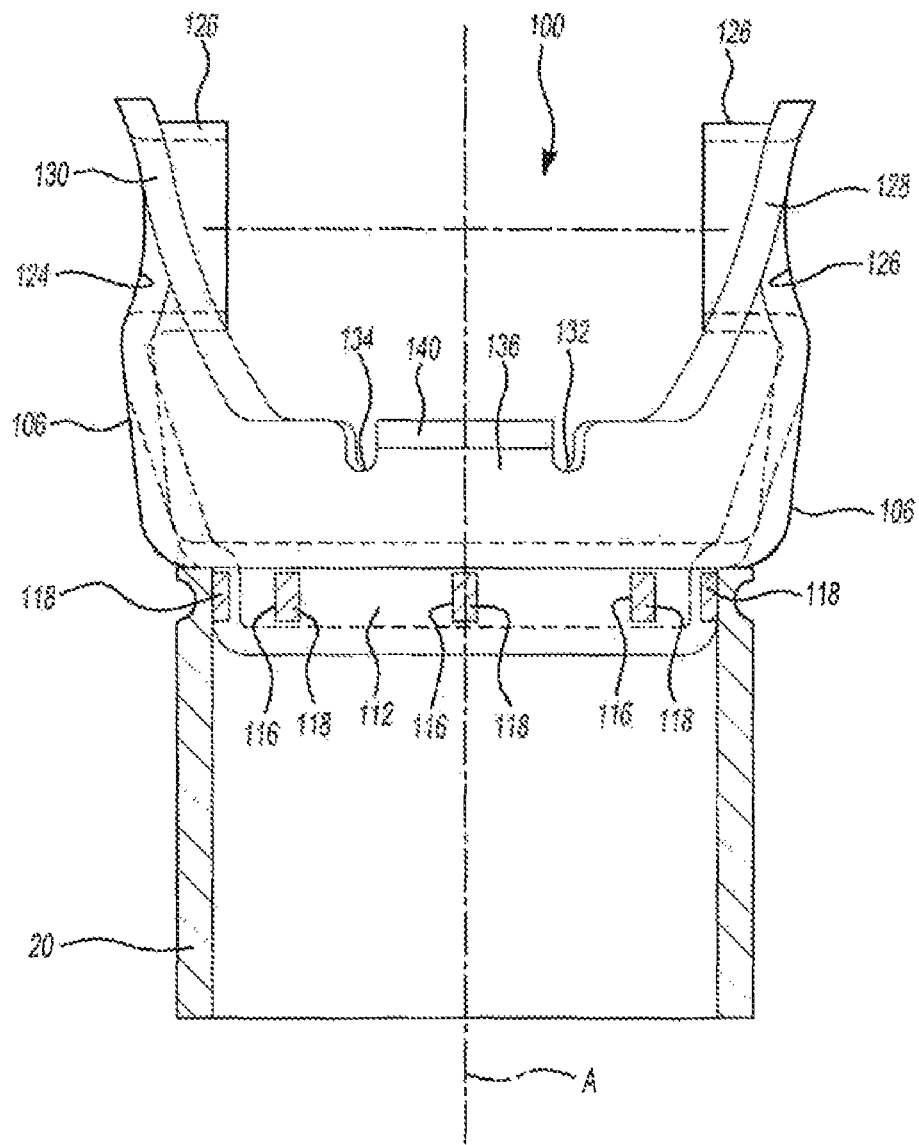
FIG. 11 is a side and partially cross sectional view of the yoke portion shown in FIG. 8 mechanically connected to the drive shaft.

As best shown in FIGS. 10 and 11, a plurality of circumferentially spaced female connectors 116 are defined in the neck 112 to mechanically engage the second drive shaft 20. A plurality of male connectors or protuberances 118 are defined in the internal surface of the drive shaft 20. The male connectors 118 of the drive shaft 20 mechanically engage the female connectors 116 of the second yoke 100, thereby preventing longitudinal and lateral movement of the second yoke 100 during rotation of the universal joint 18 about the longitudinal axis A, which reduces vibration of the universal joint 18 connected to the second yoke 100.

Figure 8:
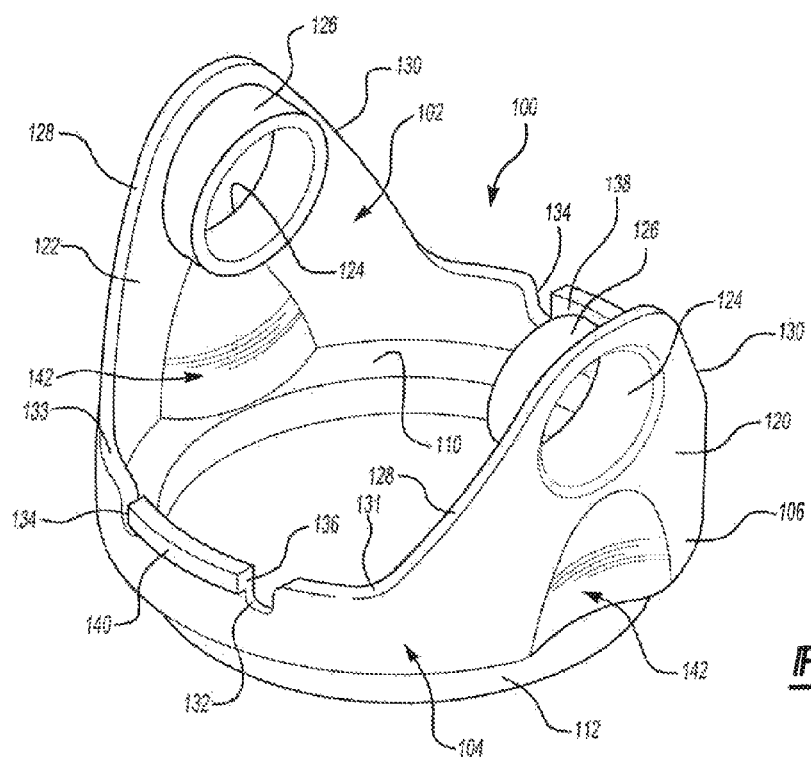
FIG. 8 is a perspective view of an alternative embodiment of the yoke portion of the universal joint assembly.
Figure 9:
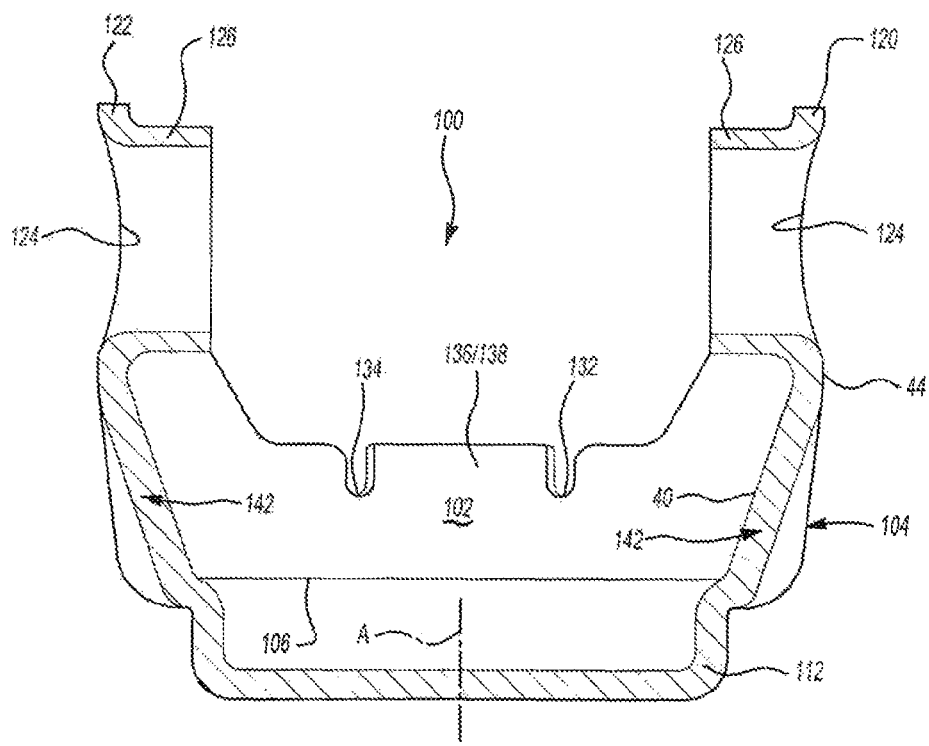
FIG. 9 is a cross sectional view of the yoke portion shown in FIG. 8.

A pair of spaced lugs 120 and 122 extends outwardly from the cup portion 106. Each of the spaced lags 120 and 122 presents an opening 124. The spaced lugs 120 and 122 are oriented diametrically with respect to one and the other. Each of the spaced lugs 120 and 122 includes an annular sleeve 126 integral with and circumscribing the opening 124. Each of the spaced lugs 120 and 122 includes side walls 128 and 130 sloping relative the longitudinal axis A. The dish 106 and each of the sloping side walls 128 and 130 are interconnected by scalloped corners, as shown in FIGS. 8 and 10. Alternatively, the dish 106 and each of the sloping side walls 128 and 130 are interconnected by non-scalloped corners, not illustrated in the present invention. The annular sleeve 126 extends outwardly from the internal surface 102 of the second yoke 100. The annular sleeve 126 presents a mechanical engagement with a pair of the first 34, 36 or second 38, 40 trunnions of the cruciform assembly 28 in a manner known to those skilled in the differential art. In addition, the annular sleeve 126 provides additional structural reinforcement for locking the pair of the first 34, 36 or second 38, 40 trunnions of the cruciform assembly 28 within and between the spaced lugs 120 and 122. A plurality of notches 132 and 134 are defined in the cup portion 104.

A pair of oppositely spaced tabs 136 and 138 is defined between each with each notch 132 and 134. Each of the spaced tabs 136 and 138 terminates in a folded lip portion 140 to strengthen the second yoke 100 in this area of cut off. An indentation or muscle, generally indicated at 142, is deformed in each of the spaced lugs 120 and 122 for strengthening the spaced lugs 120 and 122. The muscle 142 is formed by stamping the external surface 104 of the second yoke 100 to form a concavely curved cavity, which extends to a convexly curved, portion of the gusset 142 as viewed from the internal surface 102. Preferably, the gusset 142 presents a triangular configuration as viewed from the external surface 104 of the second yoke 100 and a beveled triangular configuration as viewed from the internal surface 102.

Figure 12:
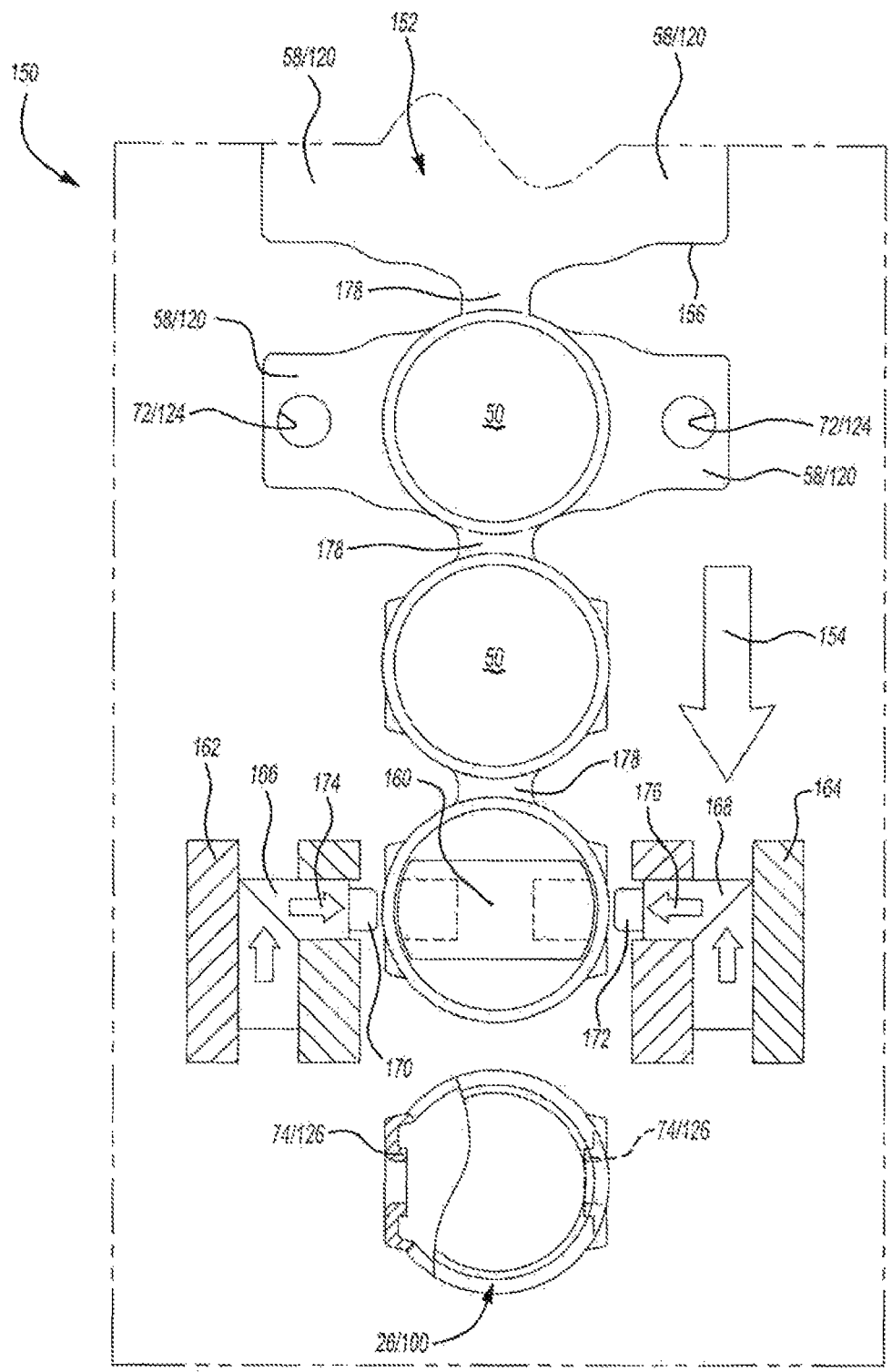
FIG. 12 is a top view of the progressive stamping stages of forming the yoke portion.

The yoke portions 26 and 100 are formed by a progressive stamping, generally shown at 150 in FIG. 12, which is distinguished from machining, the shaping of metal by removing material (drilling, sawing, milling, turning, grinding, etc.) and from casting, wherein metal in its molten state is poured into a mold, whose form it retains on solidifying. The progressive stamping 150 is a metalworking process that can encompass punching, coining, bending and several other ways of modifying metal raw material, a strip of metal, generally indicated at 152, as it unrolls from a coil (not shown), supplied by an automatic feeding system (not shown). The automatic feeding system pushes the strip of metal 152 in a progressive direction 154 through all of the stations or stages of the progressive stamping 150, as discussed further below. Each station performs one or more operations until a finished part, such as the yoke portion 26 or 100 is formed. These operations are performed by a progressive stamping die (not shown). The progressive stamping die is placed into a reciprocating stamping press (not shown). As the reciprocating stamping press moves up, the progressive stamping die opens. When the progressive stamping press moves down, the progressive stamping die closes.

When the stamping press opens, the strip of metal 152 is feed therein by the automatic feeding system pushes the strip of metal 152 in the progressive direction 154, as best illustrated in FIG. 12. As the stamping press closes, the progressive stamping die performs work on the raw material, progressive stamping die, such as punching a contour 156 of the yoke portion, which includes the aforementioned spaced luggs and a bottom of the yoke portion. As the progressive stamping 150 proceeds, the openings 72, 124 are punched out in each of the spaced lugs and the bottom of the yoke portion is stamped or deformed into the aforementioned dish. As the automatic feeding system pushes the strip of metal 152 in the progressive direction 154, the spaced lugs are bent to extend substantially perpendicular to the bottom of the yoke portion. As the strip of metal 152 is feed along the progressive direction 154 a button member 160 is inserted between the spaced lugs to provide a support for the spaced lugs as a pair of opposite die members 162 and 164 are oriented to form the annular sleeves 74 or 126. The mechanical aspects of the opposite die members 162 and 164 are known to those skilled in the stamping art. A pair of sliding mechanisms 166 and 168 of the respective opposite die members 162 and 164 terminate into a press die 170 and 172. The diameter of each press die 170 and 172 is larger than the diameter of the openings 72, 124 to facilitate stamping of the annular sleeves 74, 126 as the sliding mechanisms 166 and 168 are moved towards one and the other in the respective punching directions 172 and 174 as the press dies 170 and 172 force the metal around the openings 72, 124 into the annular sleeve 74 and 126. The final stage of the progressive stamping 150 separates the finished part, i.e. the yoke portion 26 and 100 from a carrying web or link 178. The carrying web or link 178, along with metal that is punched away in the previous operations, is treated as scrap metal.

As set forth above, the several embodiments of the monolithic yoke of this invention may be formed by stamping an HSLA steel sheet. The high strength steel is further strengthened in the stamping operation by work hardening, typically as much as 30%. The thickness of the sheet and the resultant monolithic yoke will depend upon the application, but is preferably less than 10 mm, typically 3, 4, or 5 mm depending on the size of the vehicle and the torque requirements. In a typical application, the HSLA steel sheet will be thinned somewhat during the stamping operation of less than 10% in some localized areas. An HSLA steel sheet has a strength of 60 ksi, but the work hardening will increase the strength to about 90 ksi due to work hardening.

FIGS. 13 to 17 illustrate a further embodiment of the die formed monolithic yoke assembly for a universal joint of an automotive driveline assembly of this invention. This embodiment of the monolithic yoke assembly 200 has been further strengthened by an integral outwardly deformed substantially continuous lip portion as described below.

Figure 13:
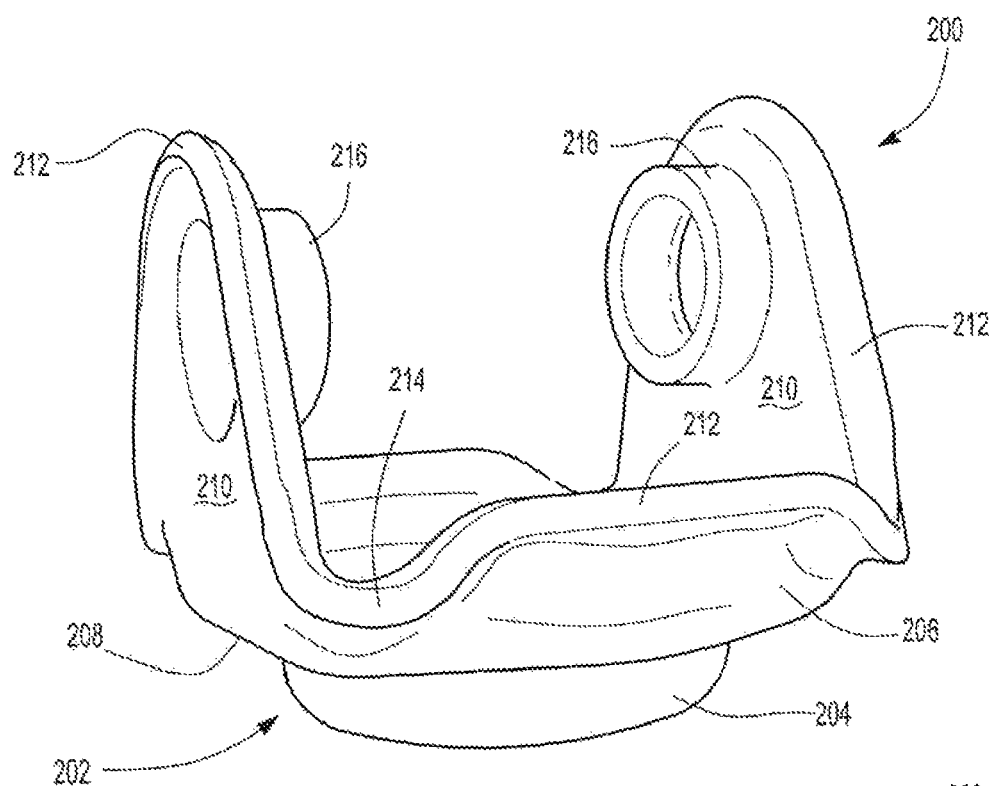
FIG. 13 is a plan view of a further alternative embodiment of the monolithic yoke assembly of this invention.
Figure 14:
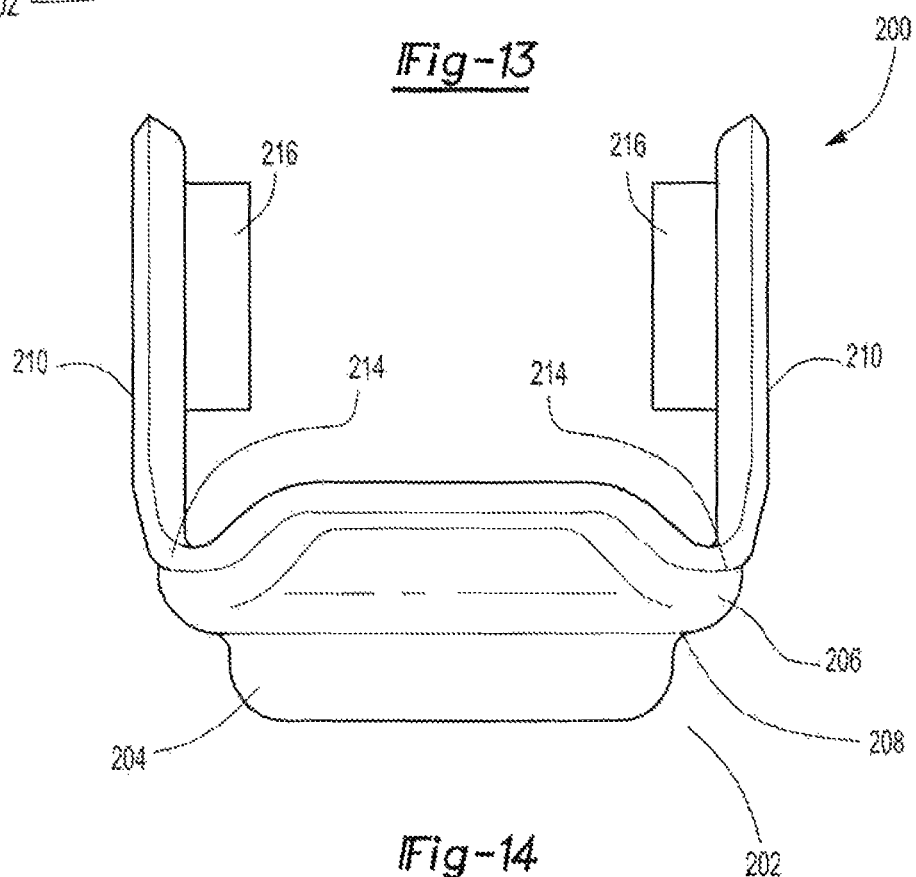
FIG. 14 is a side view of the monolithic yoke assembly shown in FIG. 13.
Figure 15:
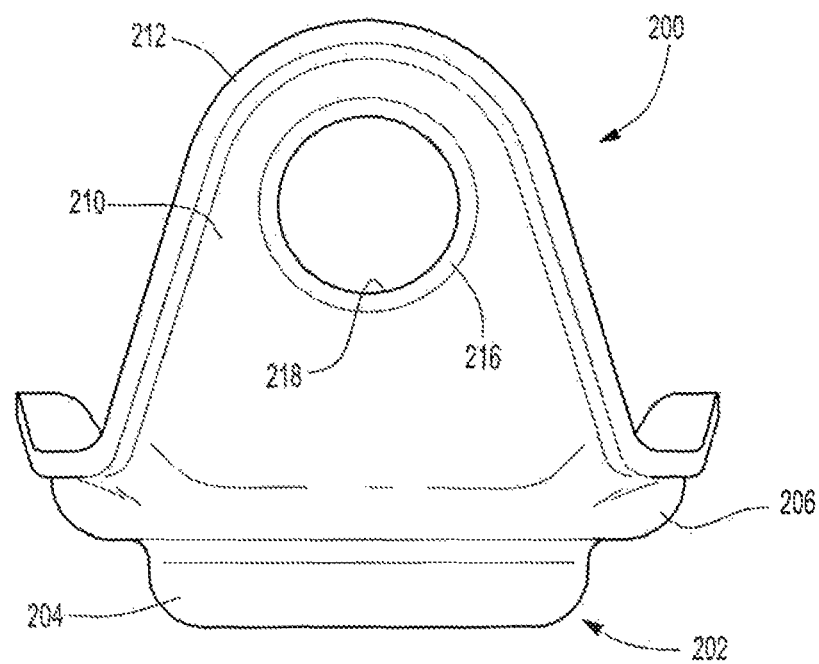
FIG. 15 is an end view of the monolithic yoke assembly shown in FIGS. 13 and 14.

The die formed yoke assembly 200 shown in FIGS. 13 through 19 includes a cup-shaped portion 202 having an annular wall 204. In this embodiment, the annular wall 204 includes an upper portion 206 separated from the lower portion 204 by an outwardly extending arcuate portion 208 as best shown in FIG. 17. The yoke assembly 200 further includes a pair of opposed lugs or ears 210 integral with and extending from the upper portion 206 of the annular wall 204. As stated above, this improved embodiment preferably includes an integral outwardly deformed lip portion integrally formed with the outer surface of the lugs 210 and the upper portion 206 of the annular wall 204. In the disclosed embodiment, the integral lip portion 212 is continuous around the upper portion of the lugs 210 and extends to and around the upper portion 206 of the annular wall 204, in the disclosed embodiment, the outwardly deformed lip portion is continuous; however, the lip may be discontinued at predetermined locations depending upon the application. In the preferred embodiment, the deformed lip portion is substantially continuous significantly improving the torque resistance and strength of the die formed yoke assembly of this invention. Further, in the disclosed embodiment, the upper portion 206 of the annular wall 204 includes concave arcuate portions 214 adjacent the lug portions as shown in FIG. 13 and the substantially continuous lip portion 212 extends around the concave arcuate portion 214 as best shown in FIGS. 13 and 14. Further, the deformed lip portion 212 extends outwardly generally transverse to the outer surface of the upper portion 206 of the annular wall 204 and the outer surface of the lugs 210; however, in the disclosed embodiment, the outwardly deformed lip portion 212 extends at an angle of about 45 degrees to the outer surface of the lugs 210 and the upper portion 206 of the annular wall 204 as best shown in FIG. 17. As stated previously, the purpose of the outwardly deformed lip portion 212 is to strengthen the die formed yoke assembly, particularly for a universal joint of an automotive driveline assembly subject to high torsional loads and thus the angle can vary from about 45 degrees to nearly perpendicular. The concave arcuate portions 216 further strengthen the die formed monolithic yoke assembly.

Figure 2:
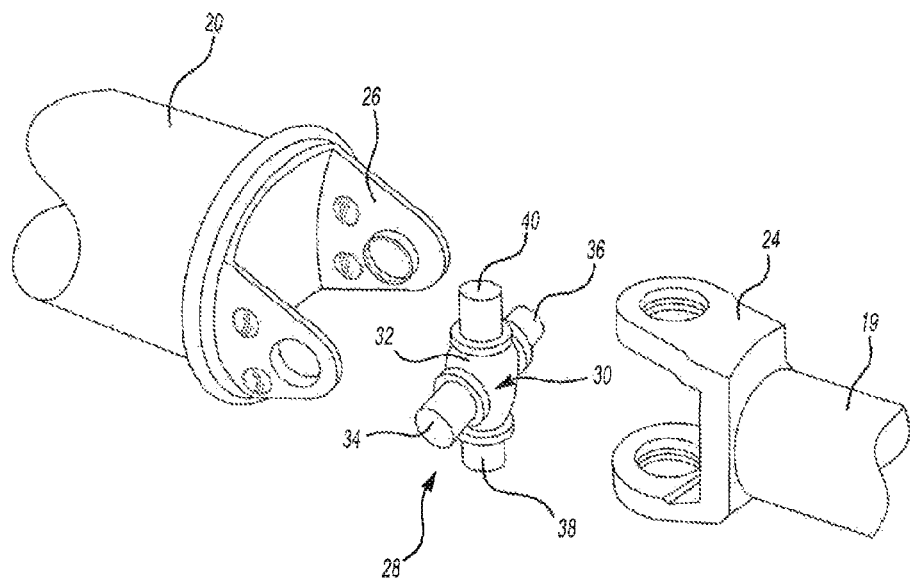
FIG. 2 is an exploded view of a universal joint assembly.
Figure 3:
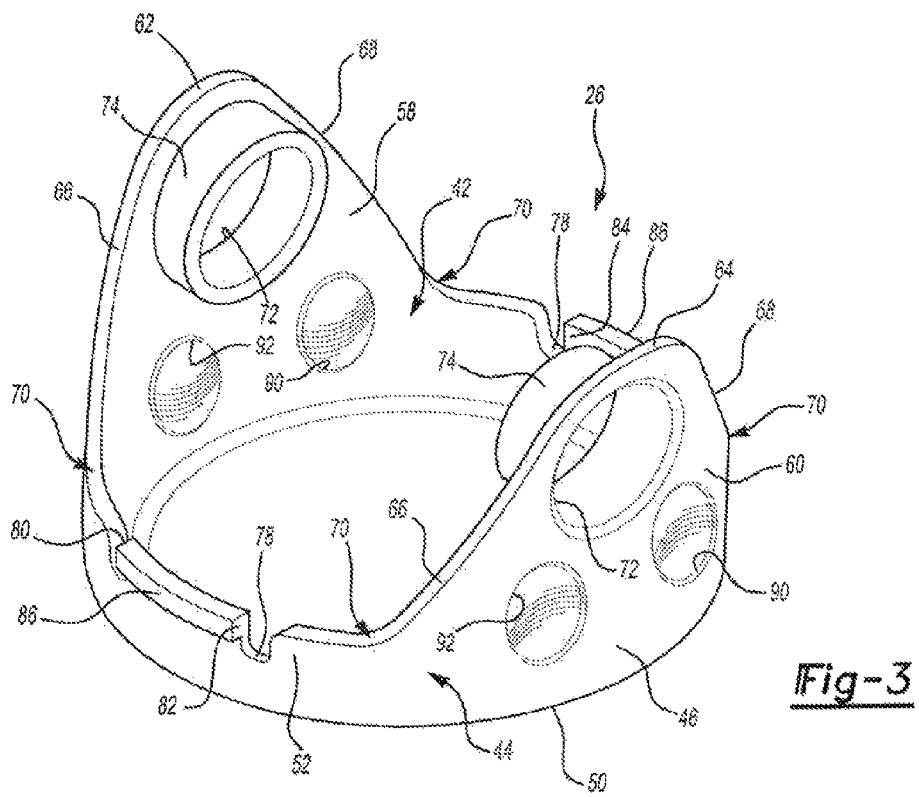
FIG. 3 is a perspective view of a yoke portion of the universal joint assembly shown in FIG. 2.
Figure 4:
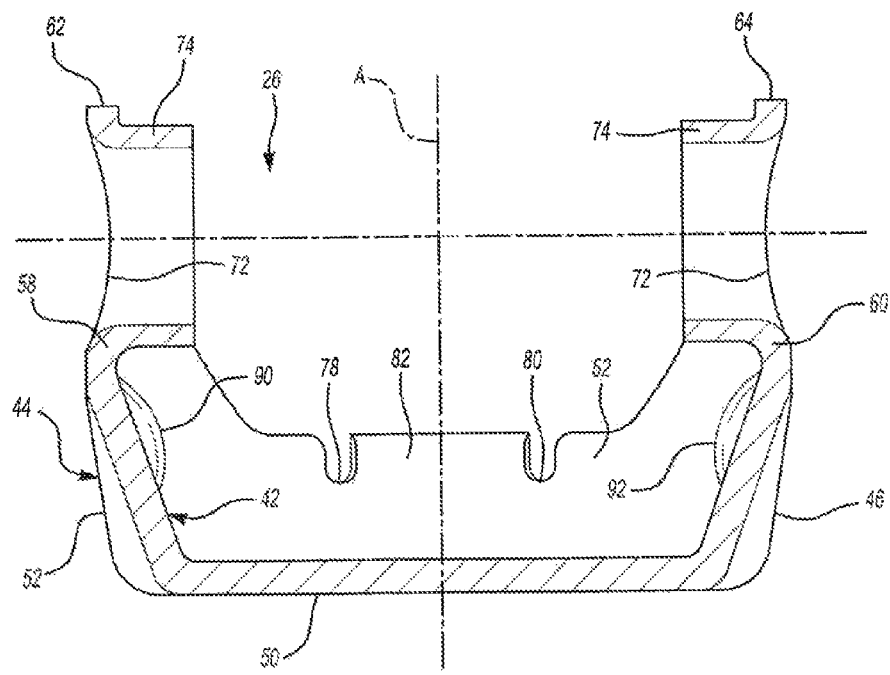
FIG. 4 is a cross sectional view of the yoke portion shown in FIG. 3.
Figure 5:
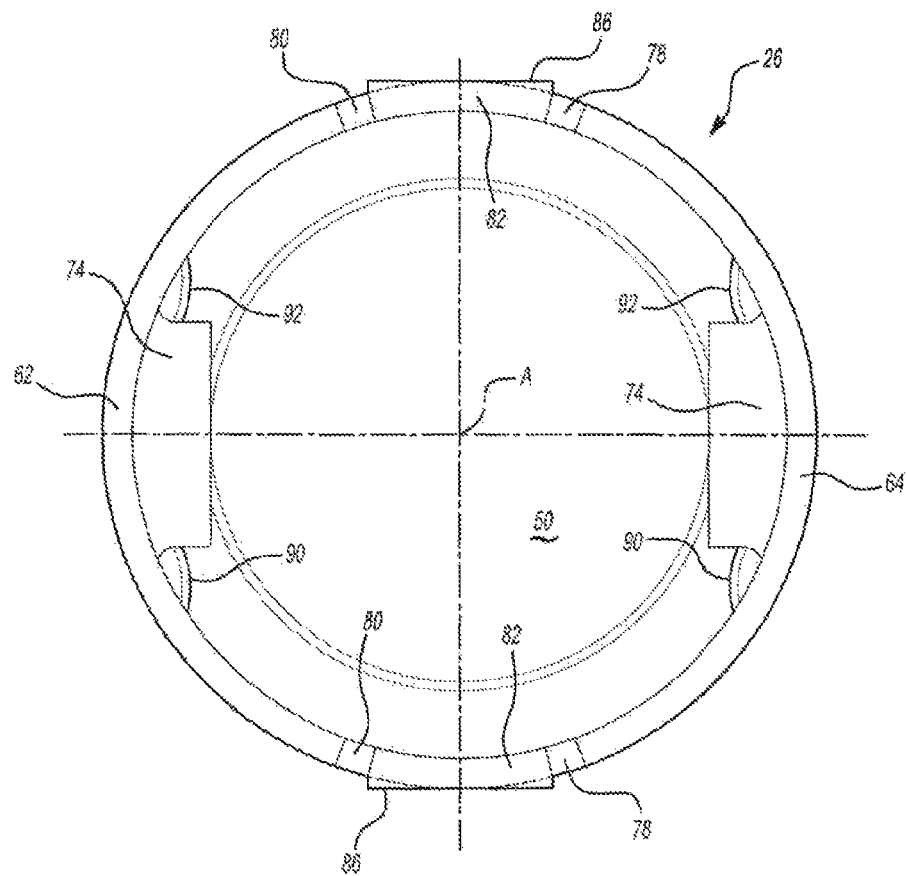
FIG. 5 is an elevational view of the yoke portion shown in FIG. 3.
Figure 16:
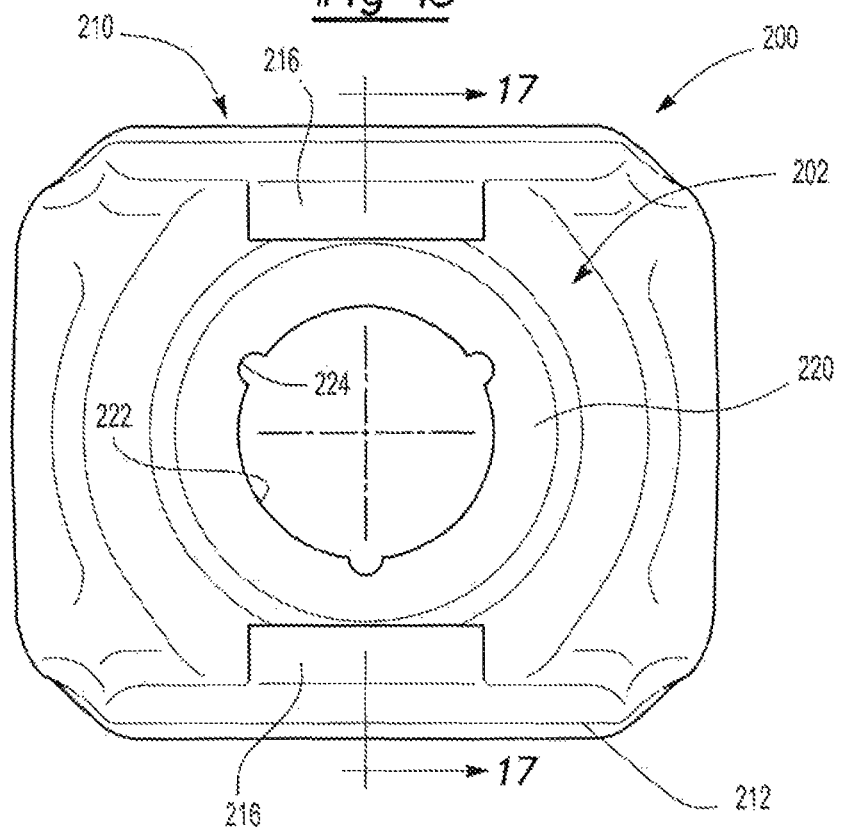
FIG. 16 is a top view of the monolithic yoke assembly shown in FIGS. 13 to 15.
Figure 19:
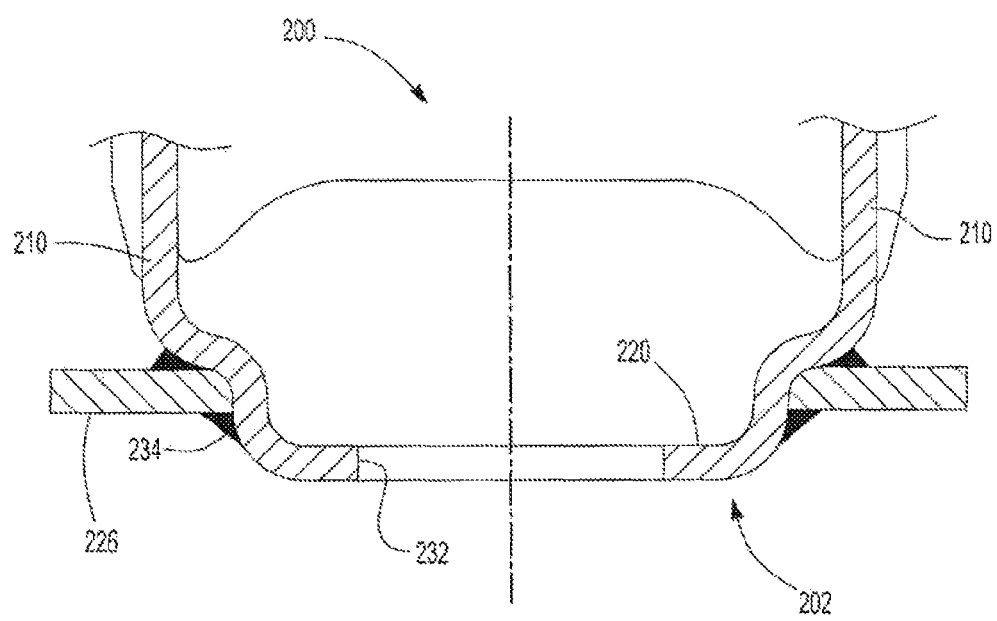
FIG. 19 is a side cross sectional view of the monolithic yoke assembly welded to the flange members shown in FIG. 18.

In the disclosed embodiment, the lugs 210 are generally planar and include integrally struck tubular annular sleeves 216. The sleeves 216 to receive the trunnions 34, 36 of the cruciform assembly 28 shown in FIG. 2 for assembly in a universal joint of an automotive driveline assembly subject to high torsional loads. The tubular sleeves 216 have a smooth cylindrical internal surface 218 to pivotally receive the trunnions 34 and 36 of the cruciform assembly 28 as shown in FIG. 2. As best shown in FIG. 16, the die formed yoke assembly of this invention includes an end wall 220 having a generally cylindrical opening 222 and locator slots 224. As would be understood by those skilled in this art, the configuration of the end wall 220, including the cylindrical opening 222 and locator slots 224 will depend upon the application for the die formed monolithic yoke assembly of this invention.

As set forth above, the die formed monolithic yoke assembly 200 of this invention is preferably formed by stamping a sheet of metal, preferably steel and most preferably HSLA steel. The thickness of the sheet will also depend upon the application and may range from 3 to 5 mm or greater but is preferably less than 10 mm. As would also be understood by those skilled in this art, the strength of the monolithic yoke assembly is increased by work hardening during the stamping operation or an increase of about 30% during stamping over the strength of the incoming parent sheet material. Because the die formed monolithic yoke assembly of this invention is formed by stamping, the overall thickness of the yoke assembly 200 is substantially uniform. However, due to thinning of the metal sheet during stamping, the overall thickness varies less than 20%, or more preferably about 10%. As will also be understood by those skilled in the art, the die formed monolithic yoke assembly for a universal joint of an automotive driveline assembly is subject to high torsional loads, typically about 2,250 ft lbs. and thus the industry has primarily relied upon cast yoke assemblies for this application. As set forth above, the substantially continuous outwardly deformed lip 212 and the concave arcuate portions 214, wherein the annular wall transitions from a concave surface to a convex surface materially strengthen the die formed monolithic yoke assembly of this invention count particularly against torsional loads. Thus, the die formed monolithic yoke assembly for automotive driveline assemblies materially reduce the weight of the yoke assemblies which is an important object of the automotive industry.

Another advantage of the die formed monolithic yoke assembly of this invention is that the connector flange may be welded directly to the annular wall of the yoke assembly. As shown in FIG. 18, the connector flange 226 has a plurality of circumferentially spaced radial ears 228 each having an aperture therethrough. The connector flange 226 further includes a central cylindrical opening 232 which closely receives the external surface of the annular wall 204 of this embodiment of the die formed monolithic yoke assembly 200 of this invention. The connector flange 226 may then be permanently attached to the die formed monolithic yoke assembly by welding as shown at 234 in FIG. 19 or other suitable means.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A die formed yoke assembly for a universal joint of an automotive driveline assembly subject to the torsional loads of an automotive driveline assembly formed by stamping a metal sheet having a substantially uniform thickness, comprising:
 a cup-shaped portion having a continuous annular wall portion, including a base portion having an end wall and an opposed open end having an upper surface;
 a pair of spaced opposed lugs integral with and extending from the upper surface of said open end of said annular wall portion of the cup-shaped portion each having upper surface; and
 an integral, outwardly deformed substantially continuous lip portion extending outwardly from and circumscribing said upper surface of said annular wall of said cup-shaped portion between said lugs and said upper surfaces of said lugs, substantially strengthening said yoke to withstand said torsional loads.

2. The die formed monolithic yoke assembly as defined in claim 1, wherein said lugs each include opposed coaxially aligned tubular sleeves projecting from a surface of said lugs.

3. The die formed monolithic yoke assembly as defined in claim 1, wherein said monolithic yoke assembly has a thickness of less than 10 mm.

4. The die formed monolithic yoke assembly as defined in claim 3, wherein the overall thickness of the yoke varies less than 20%.

5. The die formed monolithic yoke assembly as defined in claim 1, wherein the yoke assembly is integrally formed from a sheet of high strength low alloy steel by stamping.

6. The die formed monolithic yoke assembly as defined in claim 5, wherein the strength of the sheet is increased at least by 20% during stamping.

7. The die formed monolithic yoke assembly as defined in claim 1, wherein the lip portion extends a distance sufficient to materially strengthen said yoke assembly against torsional loads.

8. The die formed monolithic yoke assembly as defined in claim 1, wherein said lip extends at an angle of about 45 degrees relative to an outer surface of the lugs and annular wall.

9. The die formed monolithic yoke assembly as defined in claim 1, wherein the lip extends completely around the upper surface of the lugs and extends to and includes the upper surface of the annular wall between the lugs.

10. The die formed monolithic yoke assembly as defined in claim 1, wherein there is a concave arcuate portion between the upper surface of the annular wall and the lugs which transitions from a concave surface to a convex surface at said lip portion.

11. A die formed monolithic yoke assembly for a universal joint of an automotive driveline assembly subject to high torsional loads having a substantially uniformed thickness, comprising:
   a cup-shaped portion having an annular wall, including a base portion and an opposed upper open end;
   a pair of spaced opposed lugs integral with and extending from the upper open end of said annular wall of the cup-shaped portion having an upper surface and said lugs each include opposed coaxially aligned tubular sleeves;
   an integral, outwardly deformed substantially continuous lip portion extending from the upper surfaces of the annular wall of the cup-shaped portion and the lugs, substantially strengthening the yoke assembly; and
   a concave arcuate portion between the upper surface of the annular wall and the lugs transitioning from a concave surface and a convex surface at the lip portion further strengthening the yoke assembly.

12. The die formed monolithic yoke assembly as defined in claim 11, wherein the yoke assembly has a thickness of less than 10 mm.

13. The die formed monolithic yoke assembly as defined in claim 12, wherein the overall thickness of the yoke assembly varies less than 20%.

14. The die formed monolithic yoke assembly as defined in claim 12, wherein the lip extends completely around the upper surface of the lugs extending to and including the upper surfaces of the annular wall between the lugs forming a continuous lip portion.

15. A die formed monolithic yoke assembly for a universal joint of an automotive driveline assembly subject to high torsional loads having a substantially uniform thickness of less than 10 mm, comprising:
   a cup-shaped portion having an annular wall, including a base portion and an opposed upper open end;
   a pair of spaced opposed lugs integral with and extending from the upper open end of said annular wall of the cup-shaped portion having an upper surface;
   an integral, outwardly deformed substantially continuous lip portion extending from the upper surfaces of the annular wall of the cup-shaped portion and the lugs, substantially strengthening the yoke assembly; and
   a concave arcuate portion between the upper surface of the annular wall and the lugs transitioning from a concave surface and a convex surface at the lip portion further strengthening the yoke assembly.

* * * * *